US012612094B2

(12) United States Patent
Yamazaki et al.

(10) Patent No.: US 12,612,094 B2
(45) Date of Patent: Apr. 28, 2026

(54) GRIPPING DETERMINATION SYSTEM AND GRIPPING DETERMINATION METHOD

(71) Applicants: Yuki Yamazaki, Kanagawa (JP); Yousuke Kato, Kanagawa (JP); Autoliv Development AB, Vargarda (SE)

(72) Inventors: Yuki Yamazaki, Kanagawa (JP); Yousuke Kato, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 244 days.

(21) Appl. No.: 18/552,114

(22) PCT Filed: Feb. 22, 2022

(86) PCT No.: PCT/JP2022/007069
§ 371 (c)(1),
(2) Date: Sep. 22, 2023

(87) PCT Pub. No.: WO2022/209426
PCT Pub. Date: Oct. 6, 2022

(65) Prior Publication Data
US 2024/0182104 A1 Jun. 6, 2024

(30) Foreign Application Priority Data
Mar. 29, 2021 (JP) ................................. 2021-055796

(51) Int. Cl.
*B62D 1/04* (2006.01)
*B62D 1/06* (2006.01)
(52) U.S. Cl.
CPC .............. *B62D 1/046* (2013.01); *B62D 1/06* (2013.01)

(58) Field of Classification Search
CPC ................................. B62D 1/046; B62D 1/06
See application file for complete search history.

(56) References Cited

U.S. PATENT DOCUMENTS

| | | | | |
|---|---|---|---|---|
| 2006/0241818 A1* | 10/2006 | Kumon | ................. | B62D 1/046 |
| | | | | 701/1 |
| 2013/0151069 A1* | 6/2013 | Park | ....................... | B60Q 5/003 |
| | | | | 701/36 |

(Continued)

FOREIGN PATENT DOCUMENTS

| | | |
|---|---|---|
| JP | 2006-298241 A | 11/2006 |
| JP | 2014-075219 A | 4/2014 |

(Continued)

*Primary Examiner* — Naeem Taslim Alam
(74) *Attorney, Agent, or Firm* — Matthew D. Thayne; Thayne and Davis LLC

(57) ABSTRACT

Providing of a gripping determination system and gripping determination method enabling detecting whether or not the driver is gripping the steering device with higher accuracy. A gripping determination system that determines a gripping state of a steering device having an electrode on a part of a steering device of a vehicle, includes:

an electrostatic capacitance detecting part that detects electrostatic capacitance of the electrode, a steering torque sensor that detects steering torque of the steering wheel shaft, and a determining part that determines whether or not the steering device is being gripped based on detection results of the electrostatic capacitance detecting part and the steering torque sensor.

13 Claims, 5 Drawing Sheets

(56)              References Cited

U.S. PATENT DOCUMENTS

| | | | | |
|---|---|---|---|---|
| 2015/0239500 A1* | 8/2015 | Green | .................. | B62D 15/025 |
| | | | | 701/1 |
| 2015/0283998 A1* | 10/2015 | Lind | ................ | B60W 60/0055 |
| | | | | 701/23 |
| 2015/0369633 A1* | 12/2015 | Karasawa | ................ | B62D 1/04 |
| | | | | 324/686 |
| 2016/0302730 A1* | 10/2016 | Odate | .................. | A61B 5/6893 |
| 2017/0166236 A1* | 6/2017 | Iguchi | ................ | G01R 27/2605 |
| 2017/0282956 A1* | 10/2017 | Odate | ....................... | H05B 3/06 |
| 2019/0009791 A1* | 1/2019 | Hergeth | .............. | B60W 50/082 |
| 2020/0053482 A1* | 2/2020 | Nakano | ................ | H10N 30/857 |
| 2020/0158540 A1* | 5/2020 | Kunieda | .................. | B62D 1/04 |
| 2021/0053488 A1* | 2/2021 | Ochoa Nieva | ........... | B60Q 1/52 |
| 2021/0256279 A1* | 8/2021 | Hergeth | ................. | G08B 21/06 |
| 2021/0262838 A1* | 8/2021 | Anti | ........................ | G01D 3/032 |
| 2021/0371001 A1* | 12/2021 | Osako | ................... | B62D 1/046 |
| 2022/0227289 A1* | 7/2022 | Yee | ..................... | B60Q 1/2665 |
| 2022/0306180 A1* | 9/2022 | Odate | .................. | B62D 1/046 |

FOREIGN PATENT DOCUMENTS

| | | |
|---|---|---|
| JP | 2016-165940 A | 9/2016 |
| JP | 2018-001907 A | 1/2018 |
| JP | 2018-075849 A | 5/2018 |
| JP | 2019-166858 A | 10/2019 |
| WO | 2020/195620 A1 | 10/2020 |

* cited by examiner

[FIG. 1]
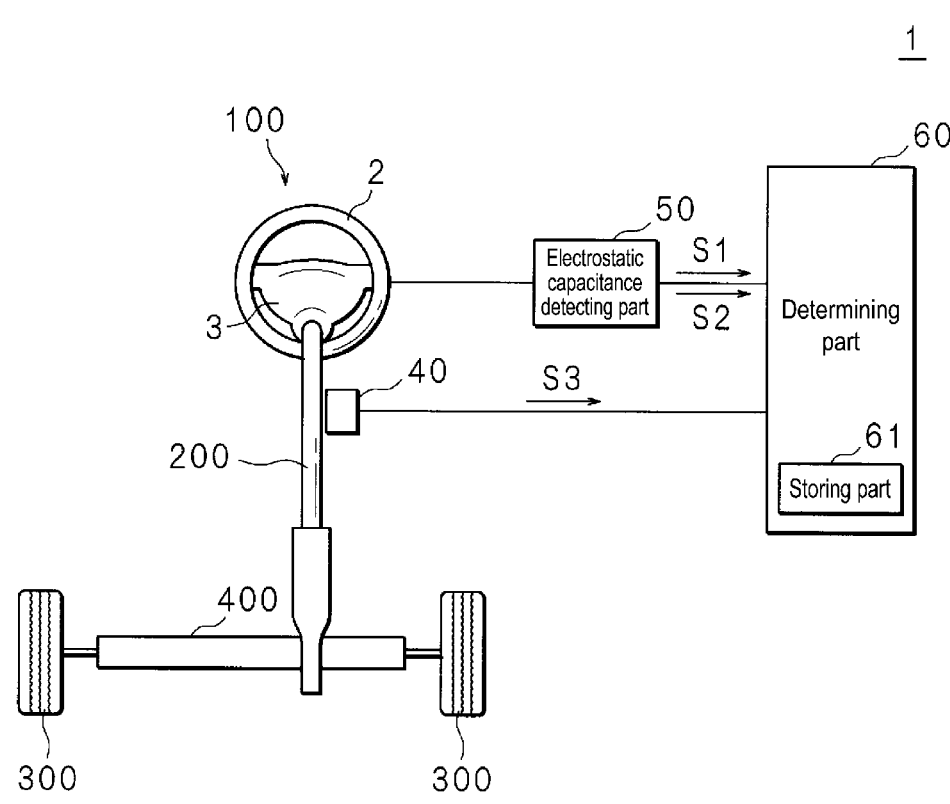

[FIG. 2]
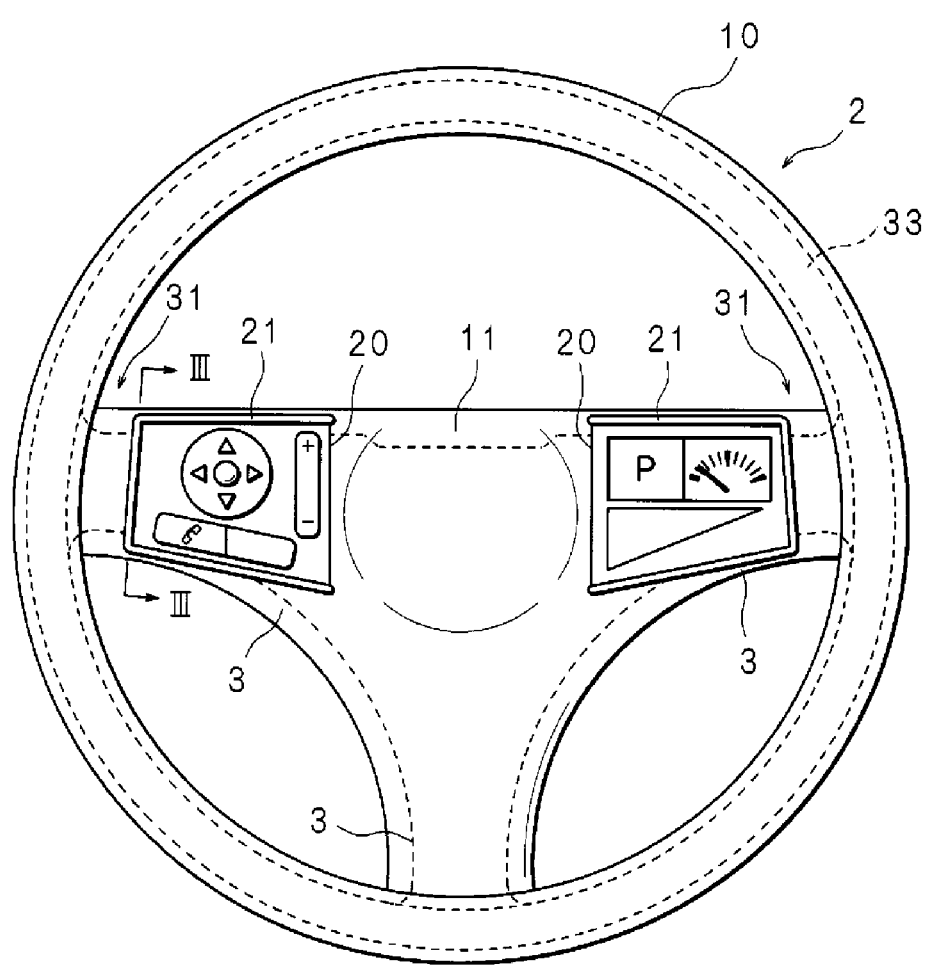
[FIG. 3]
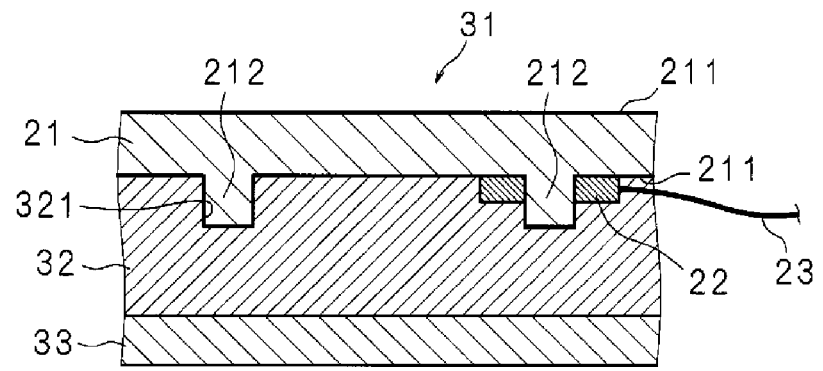

[FIG. 4]
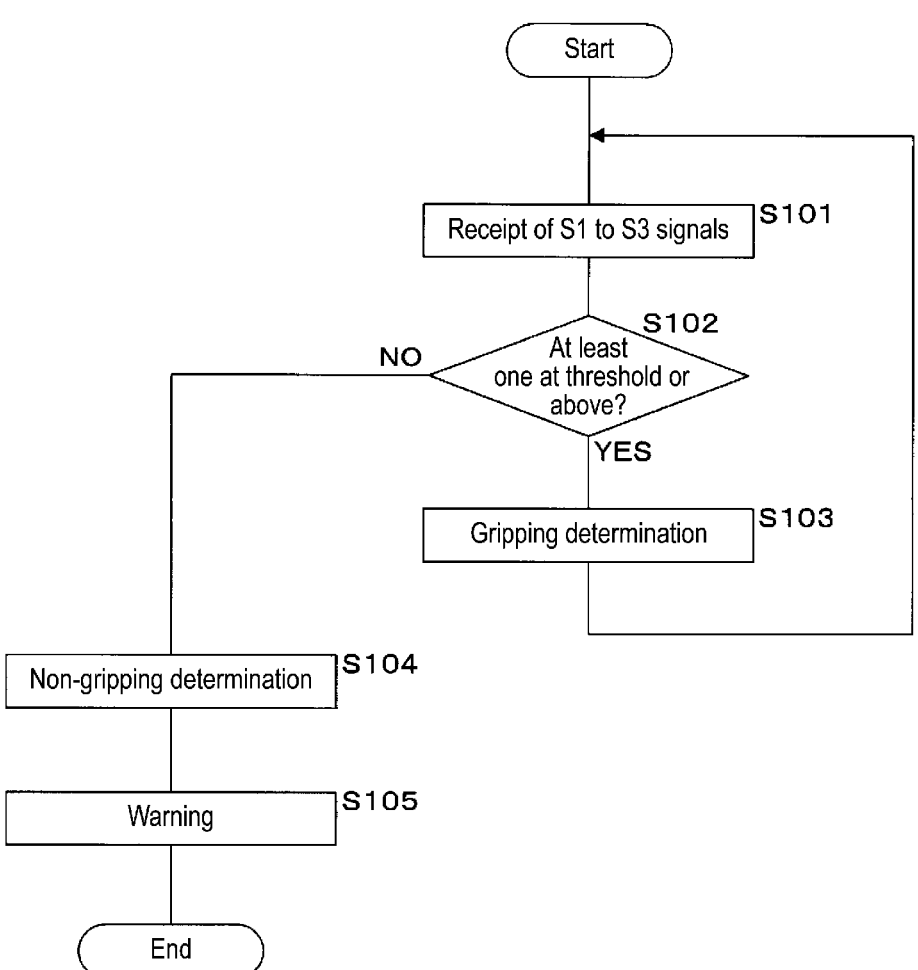

[FIG. 5]
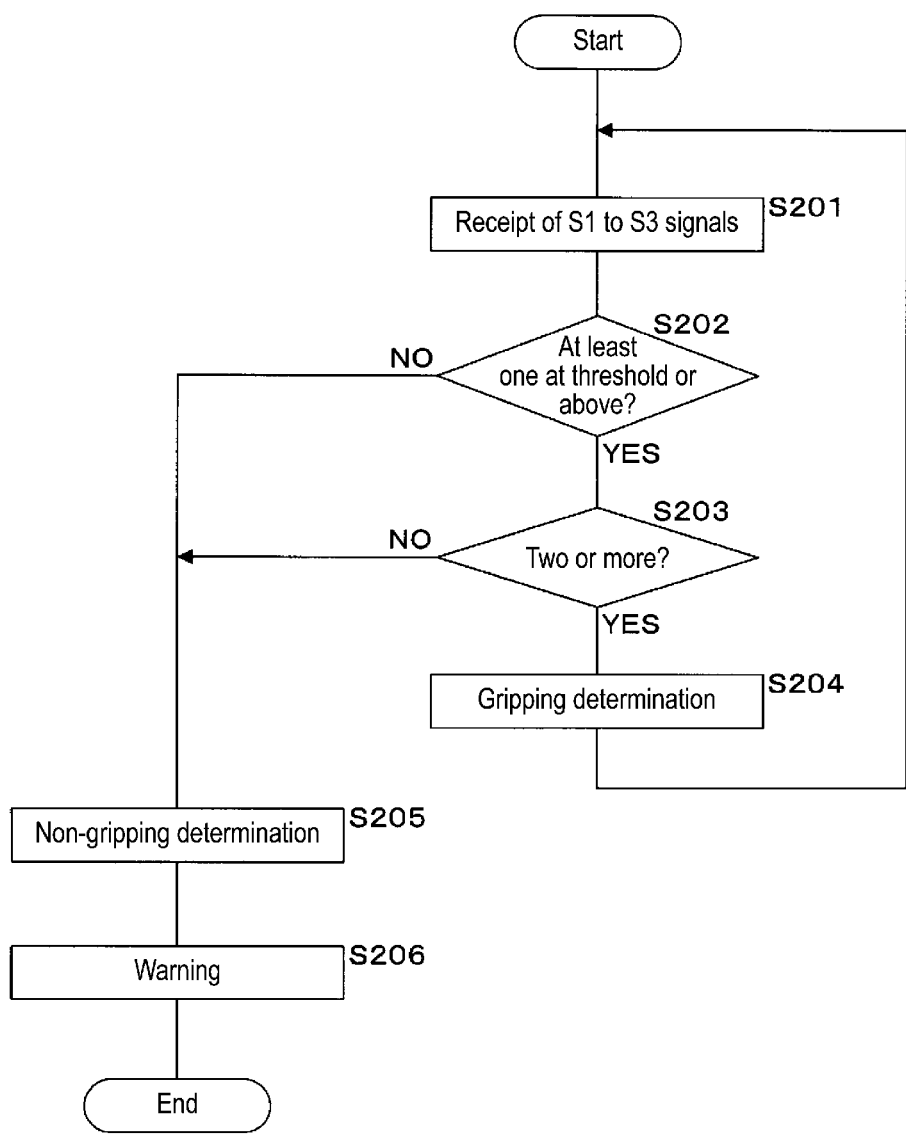

[FIG. 6]
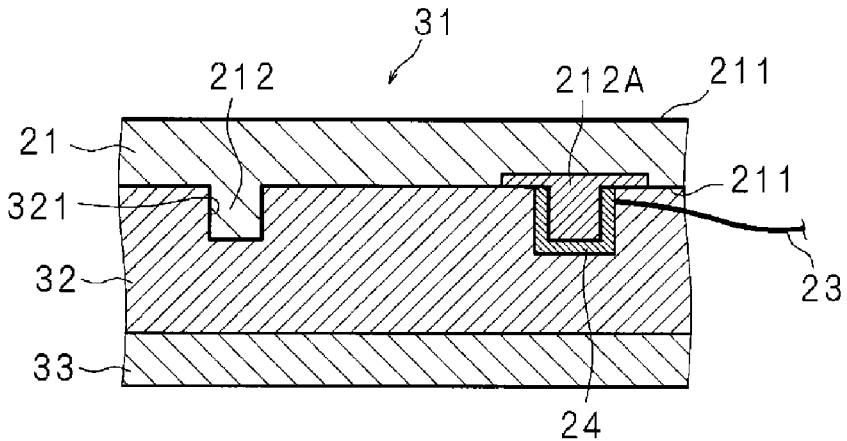
[FIG. 7]
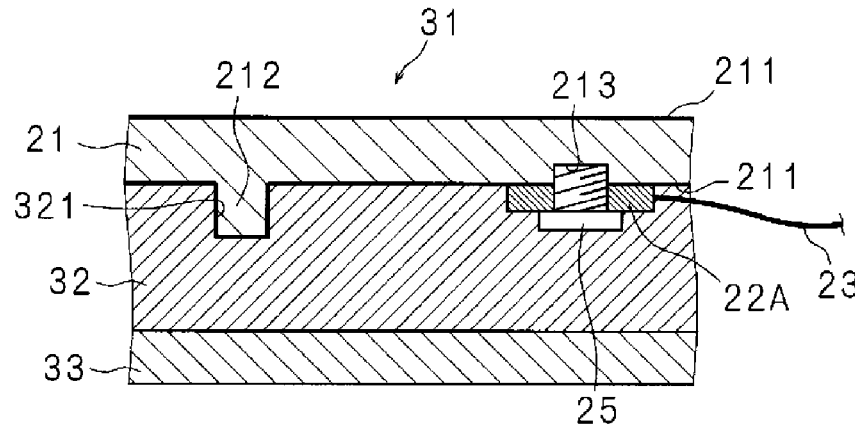

GRIPPING DETERMINATION SYSTEM AND GRIPPING DETERMINATION METHOD

TECHNICAL FIELD

The present invention relates to a gripping determination system and gripping determination method for detecting a gripping state of a steering device.

This application claims priority based on Japanese Application 2021-055796 filed Mar. 29, 2021, which is incorporated by reference in its entirety.

BACKGROUND TECHNOLOGY

In recent years, steering devices that detect whether the driver is gripping or has released the rim part based on change in electrostatic capacitance in a conductive layer provided between a surface skin layer and a metal core have become widely used.

For example, Patent Document 1 describes a steering device with a shield layer provided between the conductive layer and metal core where the parasitic capacitance generated in the conductive layer by the metal core is reduced when determining the gripping state of the driver based on the change in electrostatic capacitance.

PRIOR ART DOCUMENTS

Patent Documents

Patent Document 1: Japanese Unexamined Patent Application 2019-166858

SUMMARY OF THE INVENTION

Problem to be Solved by the Invention

In the case where the method of detecting whether or not the driver is gripping the rim based on changes in electrostatic capacitance of the conductive layer between the surface skin layer and the metal core (hereinafter called electrostatic capacitance detection method), a conductive layer is arranged in the rim part so that the distance to the hand of the driver that grips the rim part is far, causing a problem that the change in electrostatic capacitance is small and detection is difficult.

Furthermore, some steering devices have an internal heater, and in this case, there is a problem that detection accuracy of the electrostatic capacitance detection method deteriorates due to the effect of parasitic capacitance caused by the heater.

In this manner, as a method for replacing the electrostatic capacitance detection method, a method is known where the steering torque of the steering wheel shaft is detected to determine whether or not the driver is gripping the rim part based on the detection results (hereinafter called steering torque detection method).

Analogous to a clock, if the up position on the steering device is 12 o'clock, the down position is 6 o'clock, and the left and right positions are 9 o'clock and 3 o'clock, there are cases where the driver grips the steering device at positions corresponding to the 3 o'clock direction and the 9 o'clock direction. However, in this case, there is a tendency for the driver to rest an elbow on an armrest of the vehicle causing detection of steering torque to be difficult, and there is a problem that detection accuracy deteriorates.

Therefore, high accuracy detection cannot be performed with either the electrostatic capacitance detection method or the steering torque detection method. However, with the steering device of Patent Document 1, detection of whether or not the driver is gripping the rim part is performed using the electrostatic capacitance detection method and the problem described above cannot be resolved.

In light of these circumstances, an object of the present invention is to provide a gripping determination system and gripping determination method for detecting whether or not the driver is gripping the steering device with higher accuracy.

Means for Solving the Problems

The gripping determination system according to the present invention is a gripping determination system that determines a gripping state of the steering device, having an electrode on a part of a steering device of a vehicle, including:
    a first detecting part for detecting electrostatic capacitance at the electrode;
    a second detecting part for detecting steering torque of the steering wheel shaft; and
    a determining part for determining whether or not the steering device is gripped based on the detecting results of the first detecting part and the second detecting part.

The gripping determination method according to the present invention is a gripping determination method using an electrode provided on a part of a vehicle steering device for determining a gripping state of the steering device, including:
    acquiring detection results from a first detecting part for detecting electrostatic capacitance of the electrode;
    acquiring detection results from a second detecting part for detecting steering torque of a steering wheel shaft; and
    determining whether or not the steering device is being gripped based on the
    detection results of the first detecting part and the second detecting part.

Effect of the Invention

The present invention can provide a gripping determination system and gripping determination method that enables detecting whether or not the driver is gripping the steering device with higher accuracy.

BRIEF DESCRIPTION OF THE DRAWINGS

FIG. 1 is an explanatory diagram describing the configuration of the main parts of the gripping determination system according to Embodiment 1;

FIG. 2 is a front view of a steering device of a vehicle steering device;

FIG. 3 is a cross-sectional view taken along the line III-III in FIG. 2.

FIG. 4 is a flowchart for describing the gripping/non-gripping determination process for determination by the determining part of the gripping determination system according to Embodiment 1;

FIG. 5 is a flowchart for describing the gripping/non-gripping determination process by the determining part of the gripping determination system according to Embodiment 2;

FIG. 6 is a cross section view depicting a cross section of a base part of one of the spoke parts of a steering device of a gripping determination system according to Embodiment 3; and FIG. 7 is a cross section view depicting a cross section of a base part of one of the spoke parts of a steering device of a gripping determination system according to Embodiment 4.

EMBODIMENTS OF THE INVENTION

A gripping determination system and gripping determination method according to embodiments of the present invention will be described below based on the drawings.

Embodiment 1

FIG. 1 is an explanatory diagram describing the configuration of the main parts of the gripping determination system 1 according to Embodiment 1. The gripping determination system 1 according to Embodiment 1 includes a vehicle steering device 100, and the vehicle steering device 100 is provided with a steering device 2. The gripping determination system 1 according to Embodiment 1 is configured to detect whether or not the driver of the vehicle (not depicted) is gripping the steering device 2.

As described above, the vehicle steering device 100 includes the steering device 2, and steering input force is received from the driver via the steering device 2. A first end part of a steering wheel shaft 200 is coupled to the steering device 2. Steering input force of the driver, in other words operating the steering device 2, causes the steering wheel shaft 200 to rotate. A steering rack 400 is engaged with a second end of the steering wheel shaft 200 and wheels 300 are coupled to both ends of the steering rack 400.

FIG. 2 is a front view of a steering device 2 of a vehicle steering device 100.

The steering device 2 includes a circular shaped rim part 10 and a hub part 11 arranged in the center of the rim part 10 and having an airbag (not depicted) installed therein. In addition, the hub part 11 is coupled to the rim part 10 by means of three spoke parts 3. The rim part 10 is covered with a surface skin material such as leather, and the hub part 11 and spoke parts 3 are covered with, for example, a resin material. Hereinafter, the case of a rim part 10 having a circular shape will be used for the description, but the rim part of the present invention is not limited to this case. Non-circular rim parts (for example, D-shape or C-shape) may be included as the rim part 10.

In other words, with the travel direction of the vehicle as the front-to-back direction; if the wheels 300 are facing the front-to-back direction, the spoke parts 3 are connected to the rim part 10 in two locations in the lateral direction (vehicle width direction) and one location in the vertical direction. Specifically, the spoke parts 3 are connected on mutual opposite sides of the hub part 11, or in other words, at the left side (first position) and right side (second position) from the hub part 11, and one spoke part 3 is connected on the lower side in the vertical direction. The spoke parts 3 extend from the inner circumferential surface of the rim part 10 toward the hub part 11.

In other words, in the circumferential direction of the rim part 10, if the upward and downward directions are set as 12 o'clock and 6 o'clock, and the left and right positions are set as 9 o'clock and 3 o'clock, the spoke parts 3 are provided at the 3 o'clock position, the 6 o'clock position, and the 9 o'clock position in the clockwise direction.

An operation panel 20 (operating part) including a plurality of operation buttons to enable the driver to operate on-vehicle devices such as an audio system are provided in the resin material on, of the three spoke parts, the left side (9 o'clock direction) spoke part 3 and the right side (3 o'clock direction) spoke part 3, for example. In addition, a decorative member 21 is provided around each operation panel 20 to improve the appearance thereof. In other words, the decorative member 21 is composed of a peripheral part 21 formed around the operation panel 20. In the present embodiment, the edge of operation panel 20 excluding the portion facing the hub part 11 is surrounded by the decorative member 21. Each decorative member 21 is, for example, made of a glossy resin. Hereafter, the case that the various operation panels 20 (decorative member 21) are provided on the spoke parts 3 is described but the operation panels are not limited to this case. The operation panels 20 may be provided straddling the rim part 10 and the spoke part 3, may be provided on the rim part 10, or may be provided in the center part (boss part) of the steering device 2.

With the vehicle steering device 100 of the gripping determination system 1 according to Embodiment 1, a detecting electrode for detecting whether or not the driver is gripping the steering device 2 is provided on a base part 31 of the spoke part 3 on the steering device 2. The details are described below.

FIG. 3 is a cross-sectional view taken along the line III-III in FIG. 2. In other words, FIG. 3 depicts a cross section of the base part 31 of the left side spoke part 3 of the steering device 2.

The steering device 2 has a metal core 33. The metal core 33 is a skeletal structure portion constituting the spoke parts 3 and the rim part 10 and is incorporated in the center part of the spoke parts 3 and the rim part 10. The metal core 33 is composed of, for example, magnesium, aluminum, or the like metal or an alloy. The metal core 33 is covered by a cover part 32. In other words, the cover part 32 is incorporated between the decorative member 21 and the metal core 33. The cover part 32 has insulating properties and is composed of, for example, urethane, elastomer, or the like.

The decorative member 21 includes a plurality of protruding parts 212 that protrude toward the cover part 32. In addition, with the cover part 32, a plurality of engaging recessed parts 321 for engaging with the protruding parts 212 are embedded in the surface of the decorative member 21, at positions corresponding to each of the protruding parts 212. Each of the protruding parts 212 engage with the corresponding engaging recessed parts 321. The decorative member 21 is attached to the cover part 32 by the engaging of the protruding parts 212 and the engaging recessed parts 321. In addition, plating processing is performed on the decorative member 21 and the decorative member 21 is entirely covered with a conductive plating layer 211.

Of the plurality of protruding parts 212, a terminal 22 is electrically connected to one of the protruding parts 212. An electrical wire 23 that is electrically connected to an electrostatic capacitance detecting part 50 (first detecting part), described below, is connected to the terminal 22.

The terminal 22 is composed of an elastic conductive material such as beryllium copper, stainless steel, or a high conductivity macromolecular compound. In addition, the terminal 22 has, for example, a cylindrical shape with a prescribed height and is fit on the outside of the protruding part 212. The inside of the terminal 22 has a shape corresponding to the protruding part 212. Mating of the protruding part 212 and the terminal 22 electrically connects the protruding part 212 to the electrostatic capacitance detecting part 50 via the terminal 22 and the electrical wire 23.

In the steering device 2 described above, the configuration of the base part 31 of the spoke part 3 on the left side was described, but the base part 31 of the spoke part 3 on the right side has the same configuration, so a detailed description is omitted.

In other words, the decorative member 21 on each of the operation panels 20 provided on the left side spoke part 3 and on the right side spoke part 3 are entirely covered with a conductive plating layer 211 and the decorative member 21 (plating layer 211) are electrically connected to the electrostatic capacitance detecting part 50 via the terminal 22 and the electrical wire 23. In other words, the plating layer 211 is formed on both the exposed surface side and on the non-exposed back surface side of the decorative member 21, and the plating layers 211 on both surfaces are electrically connected.

In addition, as depicted in FIG. 1, the gripping determination system 1 according to Embodiment 1 includes the electrostatic capacitance detecting part 50. As described above, the electrostatic capacitance detecting part 50 is connected to the decorative member 21 on the left spoke part 3 (hereinafter called left side decorative member 21) as well as to the decorative member 21 on the right side spoke part 3 (hereinafter called right side decorative member 21). The electrostatic capacitance detecting part 50 is connected to a determining part 60 for determining whether or not the driver is gripping the steering device 2.

The electrostatic capacitance detecting part 50 detects the change in electrostatic capacitance that occurs in the decorative member 21 (plating layer 211). For example, when the driver grips the steering device 2 and a part of the hand approaches or comes into contact with the base part 31 (decorative member 21) of the spoke part 3, the electrostatic capacitance generated between the plating layer 211 and the hand of the driver is detected by the electrostatic capacitance detecting part 50. The electrostatic capacitance detecting part 50 periodically detects the electrostatic capacitance and outputs the detecting results to the determining part 60.

In other words, in the gripping determination system 1 according to Embodiment 1, the left side decorative member 21 and right side decorative member 21 (plating layer 211) serve as detecting electrodes for detecting electrostatic capacitance. The detection results (first electrostatic capacitance) of the electrostatic capacitance for the left side decorative member 21 and the detection results of the electrostatic capacitance for the right side decorative member 21 (second electrostatic capacitance) are used for determining whether or not the driver is gripping the steering device 2.

Hereinafter, for convenience, regarding output to the determining part 60, the detection results for electrostatic capacitance for the left side decorative member 21 are called result signal S1 and the detection results of the electrostatic capacitance for the right side decorative member 21 are called result signal S2.

Furthermore, as depicted in FIG. 1, the steering wheel shaft 200 of the vehicle steering device 100 is equipped with a steering torque sensor 40. The steering torque sensor 40 detects the steering torque generated on the steering wheel shaft 200. In other words, the steering torque sensor 40 detects the rotational force generated around the steering wheel shaft 200 when the driver operates the steering device 2. The steering torque sensor 40 periodically detects steering and outputs a torque signal S3 corresponding to the detected steering torque to the determining part 60. The torque signal S3 from the steering torque sensor 40 is used to determine whether or not the driver is gripping the steering device 2.

The determining part 60 determines (hereinafter called gripping/non-gripping determination) whether or not the driver is gripping the steering device 2 based on the result signal S1, result signal S2, and torque signal S3. In addition, the determining part 60 includes a storing part 61. The storing part 61 is non-volatile memory and the storing part 61 stores a threshold used for gripping/non-gripping determination corresponding to the result signal S1, result signal S2, and torque signal S3.

FIG. 4 is a flowchart for describing the gripping/non-gripping determination process by the determining part 60 of the gripping determination system 1 according to Embodiment 1.

The determining part 60 periodically receives the result signal S1, result signal S2, and torque signal S3 from the electrostatic capacitance detecting part 50 and the steering torque sensor 40 (step S101).

Therefore, the determining part 60 reads the corresponding threshold from the storing part 61, compares this to the result signal S1, result signal S2, and torque signal S3, and determines whether or not one of these is at or above the threshold (step S102).

If it is determined that there is at least one of the received result signal S1, result signal S2, and torque signal S3 at or above the threshold (step S102: Yes), the determining part 60 determines that the driver is gripping the steering device 2 (step S103).

In addition, if it is determined that not even one of the received result signal S1, result signal S2, and torque signal S3 is at or above the threshold (step S102: No), the determining part 60 determines that the driver is not gripping the steering device 2 (step S104). Furthermore, the determining part 60, for example, sends an instruction to send an alarm via a speaker, or to turn ON a warning light on the meter panel, to warn the driver (step S105).

In general, in the case that the driver is gripping the steering device at the position corresponding to the 3 o'clock direction or the 9 o'clock direction, there are a lot of cases where an elbow is resting on an armrest of the vehicle so detecting steering torque using the torque sensor is difficult, causing deterioration in the accuracy of gripping/non-gripping determination using the torque sensor.

On the other hand, with the gripping determination system 1 according to Embodiment 1, electrostatic capacitance detection for gripping/non-gripping determination is performed using the left side decorative member 21 on the left side spoke part 3 and the right side decorative member 21 on the right side spoke part 3. In other words, with the gripping determination system 1 according to Embodiment 1, the steering device 2 is provided with a detecting electrode at positions corresponding to the 3 o'clock direction and to the 9 o'clock direction to detect gripping of the driver.

In addition to the steering torque by the steering torque sensor 40, the gripping determination system 1 according to Embodiment 1 performs gripping/non-gripping determination based on the electrostatic capacitance detection results of the left side decorative member 21 and the right side decorative member 21. Therefore, the gripping determination system 1 according to Embodiment 1 is better able to perform gripping/non-gripping determination.

Furthermore, with the gripping determination system 1 according to Embodiment 1, the decorative member 21 of the operation panel 20 on the spoke part 3 is used as a detecting electrode for detecting electrostatic capacitance. Therefore, a detecting electrode does not have to be provided separately, enabling suppressing the number of components and simplifying the gripping determination system 1.

In that described above, a case of providing the plating layer 211 that is the detecting electrode for detecting electrostatic capacitance on the left side decorative member 21 and right side decorative member 21 was described as an example, but the present invention is not limited to this case.

Note that with the gripping determination system 1 according to Embodiment 1, the plating layer 211 is provided on the left side decorative member 21 and the right side decorative member 21, so there is no hindrance to the appearance of the steering device 2, which is preferable.

In that described above, a case of gripping/non-gripping determination being performed based on the result signal S1 according to the left side decorative member 21, the result signal S2 according to the right side decorative member 21, and the torque signal S3 from the steering torque sensor 40 was described as an example but the present invention is not limited to this case. The gripping/non-gripping determination can be performed based on the result signal S1 and the torque signal S3 or the gripping/non-gripping determination can be performed based on the result signal S2 and the torque signal S3.

In addition, in that described above, an example of a case where the left side decorative member 21 and right side decorative member 21 served as detecting electrodes for detecting electrostatic capacitance was described, but the present invention is not limited to this case. With the left side spoke part 3, a detecting electrode may be provided separately on a resin member between the left side decorative member 21 and the rim part 10. With the right side spoke part 3, a detecting electrode may be provided separately on a resin member between the right side decorative member 21 and the rim part 10.

Furthermore, in that described above, a case of the decorative member 21 (plating layer 211) being connected to the electrostatic capacitance detecting part 50 by the terminal 22 having a cylindrical shape and being fitted to the protruding part 212 was described, but the present invention is not limited to this case. The protruding part 212 may be mated to a conductive bushing in advance. In this case, interposing a bushing between the terminal 22 and the plating layer 211 enables improving the electrical contact between the terminal 22 and the plating layer 211.

Furthermore, in that described above, an example of the detecting electrode for detecting electrostatic capacitance being the plating layer 211 provided on the left side decorative member 21 and the right side decorative member 21 was described, but the present invention is not limited to this case. This can be a conductive film or conductive tape instead of the plating layer 211.

Note, in that described above, an example of the plating layer 211 being formed on both the exposed surface side and the non-exposed back surface side of the decorative member 21 was described, but the present invention is not limited to this case. For example, the plating layer 211 may be formed only on the surface on the non-exposed back surface side of the decorative member 21.

Moreover, as described above, in the case that the plating layer 211 is formed on both the exposed surface side and the non-exposed back surface side of the decorative member 21, the decorative member 21 may be covered with a material that is even more transparent on the surface of the exposed surface of the decorative member. Specifically, for example, a transparent resin coating or glass coating may be applied via UV curing, heat curing, chemical mixing, chemical curing, or the like. Therefore, the durability and wear resistance of the plating layer 211 formed on the surface of the exposed surface of the decorative member 21 is improved.

Embodiment 2

FIG. 5 is a flowchart for describing the gripping/non-gripping determination process by the determining part 60 of the gripping determination system 1 according to Embodiment 2.

The determining part 60 periodically receives the result signal S1, result signal S2, and torque signal S3 from the electrostatic capacitance detecting part 50 and the steering torque sensor 40 (step S201).

Therefore, the determining part 60 compares the corresponding threshold and the received result signal S1, result signal S2, and torque signal S3, and determines whether or not one of these is at or above the threshold (step S202).

In the case that one or more of the received result signal S1, result signal S2, and torque signal S3, are at or above the threshold (step S202: Yes), the determining part 60 determines whether or not there are two or more at or above the threshold based on the determination results in step S202 (step S203).

In the case that two or more of the received result signal S1, result signal S2, and torque signal S3 are at or above the threshold (step S203: Yes), the determining part 60 determines that gripping is being performed (step S204).

In addition, in the case that none of the received result signal S1, result signal S2, and torque signal S3 is at or above the threshold (step S202: No), the determining part 60 determines that gripping is not being performed (step S205). Furthermore, in step S203, if it is determined that two or more of the received result signal S1, result signal S2, and torque signal S3 are not at or above the threshold (step S203: No), the determining part 60 determines that gripping is not being performed (step S205).

Furthermore, the determining part 60, for example, sends an instruction to send an alarm via a speaker, or to turn ON a warning light on the meter panel, to warn the driver (step S206).

As described above, the gripping determination system 1 according to Embodiment 2 is configured to determine that gripping is being performed only in the case that two or more of the received result signal S1, result signal S2, and torque signal S3 are at or above the threshold. In other words, with the gripping determination system 1 according to Embodiment 2, the conditions for determining that gripping is being performed are stricter. This enables improving driver safety.

Embodiment 3

FIG. 6 is a cross section view depicting a cross section of a base part 31 of one of the spoke parts 3 of the steering device 2 of the gripping determination system 1 according to Embodiment 3.

Similar to Embodiment 1, with the gripping determination system 1 according to Embodiment 3, the spoke parts 3 include an operation panel 20 (decorative member 21) and a metal core 33, and a cover part 32 is interposed between the decorative member 21 and the metal core 33.

The decorative member 21 includes a plurality of protruding parts 212 that protrude toward the cover part 32. In addition, with the cover part 32, engaging recessed parts 321 are provided at a position corresponding to each protruding part 212 and each engaging recessed part 321 engages with the corresponding protruding part 212. The decorative member 21 is attached to the cover part 32 by the engaging of the protruding parts 212 and the engaging recessed parts 321.

With the gripping determination system 1 according to Embodiment 3, in one of the plurality of protruding parts 212, one protruding part 212A is composed of conductive metal. For example, using two color molding, insert molding, or the like method, enables composing only protruding part 212A of metal, of the plurality of protruding parts 212 of the decorative member 21. Plating treatment is performed on the surface of the decorative member 21 containing the protruding part 212A, such that a conductive plating layer 211 covers the entire surface.

The protruding part 212A is electrically connected to an engaging terminal 24. The engaging terminal 24 is connected to the electrostatic capacitance detecting part 50 via the electrical wire 23.

The engaging terminal 24 is composed of a conductive material and has a cylindrical shape with a bottom. The inside of the engaging terminal 24 has a shape corresponding to the protruding part 212A, and the protruding part 212A is inserted into the engaging terminal 24 and engages with the engaging terminal 24. Mating of the protruding part 212A and the engaging terminal 24 enables connecting the protruding part 212A to the electrostatic capacitance detecting part 50 via the engaging terminal 24 and the electrical wire 23.

In the steering device 2 described above, the configuration of the base part 31 of one of the spoke parts 3 was described but the base part 31 of the other spoke part 3 has the same configuration so a detailed description is omitted.

As described above, the gripping determination system 1 according to Embodiment 3 has protruding part 212A composed of conductive metal and the surface of the decorative member 21 including the protruding part 212A is entirely covered with the conductive plating layer 211. In addition, the protruding part 212A is composed of conductive material, is inserted into the engaging terminal 24 having a cylindrical shape with a bottom, and is engaged with the engaging terminal 24.

Therefore, with the gripping determination system 1 according to Embodiment 3, a broad contact surface between the protruding part 212A and the plating layer 211 is ensured. Therefore, even if the plating layer 211 peels in a manufacturing process of inserting the protruding part 212A into the engaging terminal 24, electrical connecting between the protruding part 212A and the engaging terminal 24 can be guaranteed.

Sections similar to Embodiment 1 are given the same code and detailed description thereof is omitted.

Embodiment 4

FIG. 7 is a cross section view depicting a cross section of a base part 31 of one of the spoke parts 3 of the steering device 2 of the gripping determination system 1 according to Embodiment 4.

Similar to Embodiment 1, with the gripping determination system 1 according to Embodiment 4, the spoke parts 3 include an operation panel 20 (decorative member 21) and a metal core 33, and a cover part 32 is interposed between the decorative member 21 and the metal core 33.

The decorative member 21 includes a plurality of protruding parts 212 that protrude toward the cover part 32.

Plating treatment is performed on the surface of the decorative member 21, such that a conductive plating layer 211 covers the entire surface.

In addition, with the cover part 32, engaging recessed parts 321 are provided at a position corresponding to each protruding part 212 and each engaging recessed part 321 engages with the corresponding protruding part 212. The decorative member 21 is attached to the cover part 32 by the engaging of the protruding parts 212 and the engaging recessed parts 321.

With the gripping determination system 1 according to Embodiment 4, a terminal 22A is secured to the decorative member 21 (plating layer 211). The terminal 22A is connected to the electrostatic capacitance detecting part 50.

The terminal 22A is composed of a conductive material and has a flat annular shape. A screw 25 is passed through an inner hole of the terminal 22A and screwed into the a screw hole 213 provided in the decorative member 21 to screw the terminal 22A to the decorative member 21. In addition, this enables electrically connecting the terminal 22A with the plating layer 211 of the decorative member 21. In other words, the decorative member 21 is connected to the electrostatic capacitance detecting part 50 via the terminal 22A and the electrical wire 23.

In the steering device 2 described above, the configuration of the base part 31 of one of the spoke parts 3 was described but the base part 31 of the other spoke part 3 has the same configuration so a detailed description is omitted.

As described above, with the gripping determination system 1 according to Embodiment 4, the terminal 22A is screwed to the decorative member 21. Thus, even if the plating layer 211 interposed between the decorative member 21 and the terminal 22A peels, electrical connection between the decorative member 21 (plating layer 211) and the terminal 22A is guaranteed.

Sections similar to Embodiment 1 are given the same code and detailed description thereof is omitted.

EXPLANATION OF CODES

1. Gripping determination system
2. Steering device
3. Spoke part
10. Rim part
20. Operation panel (operating part)
21. Decorative member (peripheral part)
22, 22A. Terminal
24. Engaging terminal
31. Base part
32. Cover part
33. Metal core
40. Steering torque sensor (second detecting part)
50. Electrostatic capacitance detecting part (First detecting part)
60. Determining part
211. Plating layer (electrode)
212, 212A. Protruding part

The invention claimed is:

1. A gripping determination system that determines a gripping state of a steering device, having an electrode on a part of the steering device of a vehicle, the gripping determination system comprising:
    a first detecting part for detecting electrostatic capacitance at the electrode;
    a second detecting part for detecting steering torque of a steering wheel shaft; and a determining part for determining whether or not the steering device is gripped based on the detecting results of the first detecting part and the second detecting part, wherein the steering device includes a rim part that a driver can grip and spokes extending from near a center of the steering device toward the rim part, and the electrode is provided in a base part of a spoke part, and wherein an operating part for operating on-vehicle devices is provided on the spoke part and the electrode is provided on a decorative member provided on the operating part.

2. The gripping determination system according to claim 1, wherein the steering device includes a rim part that a driver can grip and the electrode is provided on the rim part.

3. The gripping determination system according to claim 1, wherein the decorative member constitutes a peripheral part formed around the operating part.

4. The gripping determination system according to claim 1, further comprising:

a terminal electrically connected to the first detecting part; wherein the electrode is formed as a conductive plating layer on the surface of a non-exposed back surface of the decorative member, the decorative member includes a protruding part protruding toward a metal core of the steering device, and the terminal engages with the protruding part.

5. The gripping determination system according to claim 4, wherein the plating layer is formed on the surface of both an exposed surface side and the non-exposed back surface side of the decorative member and the plating layer on both surfaces is electrically connected.

6. The gripping determination system according to claim 5, wherein the plating layer provided on the exposed surface side of the decorative member is covered with a transparent material.

7. The gripping determination system according to claim 1, wherein the electrode is arranged at a first position or second position or at a first position and a second position on opposite sides from the center of the steering device in the vehicle width direction of the vehicle.

8. The gripping determination system according to claim 7, wherein the determining part determines that the steering device is being gripped in the case that at least one of a first electrostatic capacitance according to the first position electrode, a second electrostatic capacitance according to the second position electrode, and the steering torque according to the second detecting part exceeds a threshold.

9. The gripping determination system according to claim 7, wherein the determining part determines that the steering device is being gripped in the case that two or more of the first electrostatic capacitance according to the first position electrode, the second electrostatic capacitance according to the second position electrode, and the steering torque according to the second detecting part exceed a threshold.

10. The gripping determination system according to claim 1, further comprising:

a cover part formed so as to cover a metal core of the steering device provided between the electrode and the metal core of the steering device, the electrode being provided on at least a surface that is in contact with the cover part; and a terminal between the cover part and the electrode that can electrically connect with the electrode.

11. A gripping determination method for using an electrode provided on a part of a vehicle steering device for determining gripping state of the steering device, comprising:

acquiring detection results from a first detecting part for detecting electrostatic capacitance of the electrode;

acquiring detection results from a second detecting part for detecting steering torque of a steering wheel shaft; and determining whether or not the steering device is being gripped based on the detection results of the first detecting part and the second detecting part, wherein the steering device comprises a rim part that a driver can grip and spokes extending from near a center of the steering device toward the rim part, wherein the electrode is provided in a base part of a spoke part, and wherein an operating part is provided on the spoke part and the electrode is provided on a decorative member provided on the operating part.

12. The gripping determination method according to claim 11, wherein as viewed from a center of the steering device in the vehicle width direction of the vehicle, the electrodes are arranged at a first position or a second position or at a first position and a second position on opposite sides, and in the case that at least one of the first electrostatic capacitance according to the electrode of the first position, the second electrostatic capacitance according to the electrode of the second position, and the steering torque according to the second detecting part exceeds a threshold, the steering device is determined to be being gripped.

13. The gripping determination method according to claim 11, wherein as viewed from a center of the steering device in the vehicle width direction of the vehicle, the electrodes are arranged at a first position or a second position or at a first position and a second position on opposite sides, and in the case that two or more of the first electrostatic capacitance according to the electrode of the first position, the second electrostatic capacitance according to the electrode of the second position, and the steering torque according to the second detecting part exceed a threshold, the steering device is determined to be being gripped.

* * * * *